Jan. 18, 1955     T. H. THOMAS     2,699,686
TRANSMISSION OPERATING MECHANISM
Filed Sept. 1, 1950     2 Sheets-Sheet 1

INVENTOR.
THOMAS H. THOMAS
BY
ATTORNEY

Jan. 18, 1955  T. H. THOMAS  2,699,686
TRANSMISSION OPERATING MECHANISM
Filed Sept. 1, 1950  2 Sheets-Sheet 2

INVENTOR.
THOMAS H. THOMAS
BY
ATTORNEY

United States Patent Office 2,699,686
Patented Jan. 18, 1955

2,699,686

TRANSMISSION OPERATING MECHANISM

Thomas H. Thomas, South Bend, Ind., assignor to Bendix Aviation Corporation, South Bend, Ind., a corporation of Delaware Application September 1, 1950, Serial No. 182,644

8 Claims. (Cl. 74—472)

This invention relates to power actuated mechanisms for selectively moving a control element to one or the other of two operative positions, and more particularly to gear shifting mechanisms for operating the speed changing gearing commonly used in coupling the engine or prime mover with the driving wheels or the like of an automotive vehicle or the propeller of a marine craft.

One of the objects of my invention is to provide a power shifting mechanism for a motor vehicle change speed mechanism said shifting mechanism being electrically selective under the control of vehicle speed responsive means and engine torque responsive means; accordingly, it is an object of my invention to provide a change speed transmission operating mechanism which is operative in accordance with both the speed of the vehicle and the power of the engine of the vehicle.

Yet another object of my invention is to provide a mechanism for operating the change speed transmission of an automotive vehicle said mechanism being automatically operative to establish the transmission in a relatively low gear ratio setting when the speed of the vehicle is dropped below a certain factor and the accelerator of the vehicle is moved to or below a certain throttle open position; and it is a further object of my invention to so construct this transmission operating mechanism that the same is operative to establish the transmission in either a relatively high gear ratio setting or the aforementioned relatively low gear ratio setting when the accelerator is moved to or beyond the aforementioned throttle open position, the vehicle is traveling above a certain speed and the intake manifold vacuum of the engine of the vehicle reaches a certain factor there being one factor for effecting the low gear setting and another factor for effecting the high gear setting.

Accordingly, it is an object of my invention to provide a transmission operating mechanism automatically operative to shuttle the transmission between two of its settings the operation of the mechanism depending upon the degree of intake manifold vacuum of the engine of the vehicle and the control of the mechanism being effected, in a measure, by an operation of the accelerator of the vehicle.

My invention also contemplates the provision of a simple and easily serviced transmission operating mechanism operative, when the accelerator is depressed a certain amount and the vehicle is traveling below a certain speed to establish the transmission in one setting, and operative, when the accelerator is depressed a certain amount, the speed of the vehicle exceeds a certain factor and the torque of the engine reaches one or the other of two factors, to establish the transmission in one or the other of two of its settings; and a further object of my invention is to include in this mechanism power means for momentarily closing the throttle of the engine of the vehicle as the transmission is being operated, said operation of the throttle serving to prevent a racing of the engine and facilitating the operation of the mechanism by increasing its power.

A further object of the invention is to provide a compact, easily serviced and relatively simple double acting power unit well adapted for use in mechanism for operating the shiftable elements of the two speed axle structure of an automotive vehicle.

The above and other objects and features of the invention will appear more fully hereinafter from a consideration of the following description taken in connection with the accompanying drawings where one embodiment of the invention is illustrated by way of example.

The transmission operating power means constituting my invention is preferably employed to operate a two speed axle transmission mechanism of an automotive vehicle; however, it may be employed to operate any power transmitting mechanism of the power plant of a land or marine vehicle wherein said mechanism is selectively movable to two operative positions.

Figure 1:
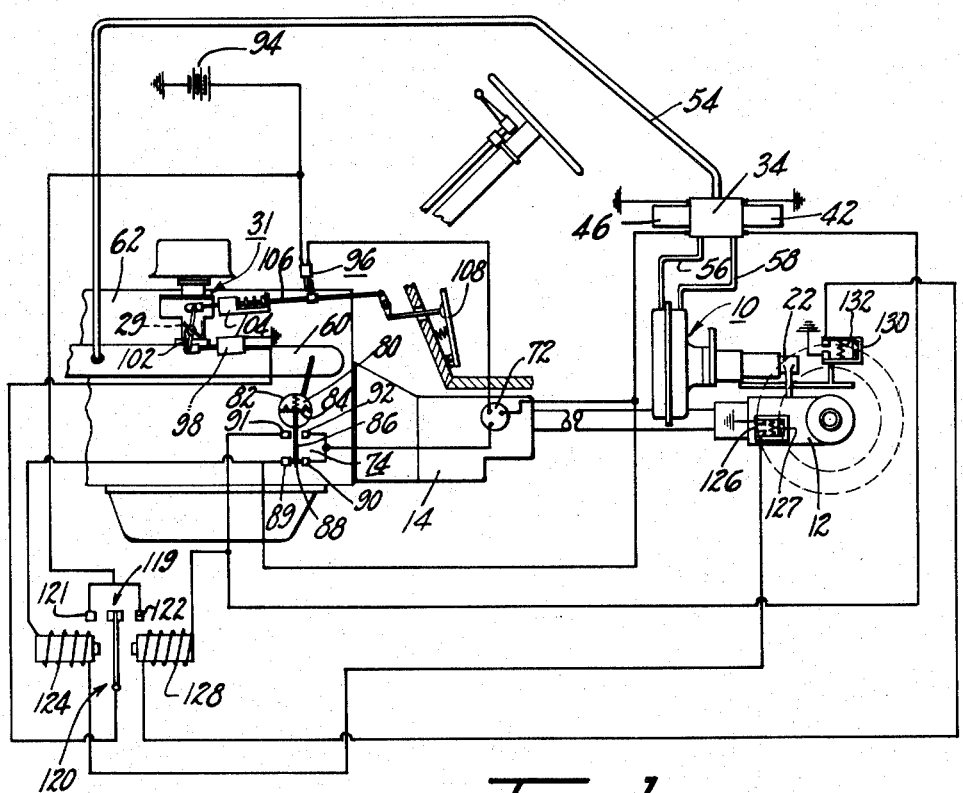
Figure 1 is a diagrammatic view of an automotive vehicle embodying the transmission operating mechanism of my invention.

Referring to Figure 1 a transmission operating power unit 10 is detachably mounted on the carrier of what is known in the automotive art as a two speed axle, that is a part of the driving mechanism of the vehicle effecting a gear ratio in addition to the usual driving ratio and different therefrom. This two speed axle mechanism, actuated by the shifter mechanism of my invention, is indicated by the reference numeral 12 and a change speed transmission mechanism cooperating therewith is indicated by the reference numeral 14. The transmission operating mechanism constituting my invention may be employed to operate a Maybach clutch type of two speed axle, however, any other well known two speed axle construction is equally well operated by the mechanism of my invention.

Figure 2:
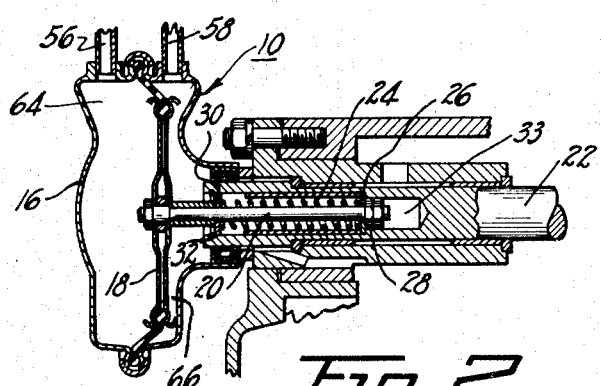
Figure 2 is a view disclosing the details of the vacuum motor of my invention.

There is disclosed in Figure 2 a preferred embodiment of the power unit 10 of the transmission operating mechanism of my invention said unit including a two-part casing 16 housing a diaphragm 18 which is secured to a rod 20. This rod is sleeved within a hollow rod 22 which is connected at its outer end to a shifting fork, not shown, of the two speed axle mechanism 12. A preloaded spring 24 housed within the rod 22 and sleeved over the rod 20, abuts at one of its ends a stop washer 26 which is in abutment with a projection 28 constituting a part of the rod 20; and the other end of the spring 24 abuts a stop washer 30 which is sleeved over the rod 20 and which is in abutment with a stop ring 32 secured to the other end of the hollow rod 22.

When the motor 10 is energized, as a result of an operation of the controls discussed hereinafter, the rod 20 is moved to the left and with it the flange 28 on the end thereof; and this flange contacts the outer face of the stop washer 26. In this operation the spring 24 is further compressed to shorten its length. In this operation when the torque of the engine is reversed, preferably as a result of a closing of the throttle valve 29 of the carburetor 31, the rod 22 will move to the left under the load of the diaphragm 18 to demesh the transmission; and after the two gears to be meshed are synchronized the spring 24 expands to effect a new setting of the transmission.

Describing the operation of the motor 10 to move the rod 22 to the right, Figure 2, to establish the other setting of the transmission 12, when said motor is energized the piston 18 moves to the right, the flanged end of the rod 20 moving within a compartment 33 outlined in part by the flange 28. Then as described above, when the engine torque is reversed and the synchronization of the gears has been effected, the spring 24 expands to effect the new setting of the transmission.

Figure 3:
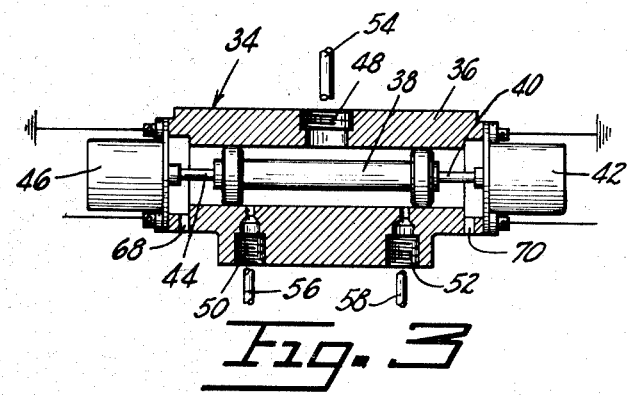
Figure 3 is a sectional view disclosing details of the valve mechanism of my invention.

A valve 34 for controlling the operation of the motor 10 is disclosed in detail in Figure 3 and includes a cylindrically shaped hollow casing 36 shaped to receive a spool shaped valve member 38. This member is provided with an extension 40 connected to the armature, not shown, of a grounded solenoid 42; and said member is also provided with an extension 44 connected to the armature, not shown, of a grounded solenoid 46. A spring, not shown, within the casing of the solenoid 42 serves to bias the valve member 38 to its valve off position disclosed in Figure 3; and a spring, not shown, within the casing of the solenoid 46 also serves to bias the valve member 38 to its valve off position. Ports 48, 50, and 52 in the valve casing are connected respectively to conduits 54, 56, and 58 which are in turn connected respectively to the intake manifold 60 of the internal combustion engine 62 of the vehicle, to a compartment 64 of the vacuum motor 10 and to a compartment 66 of said motor. It is thus apparent that the valve 34 cooperates with the motor 10 to provide a vacuum suspended type of power means inasmuch as both compartments of the motor are connected to the vacuum source when the motor is deenergized. The valve casing 36 is also ported at 68 and 70 to vent the interior of the casing to the atmosphere.

Describing the operation of the valve 34 when the solenoid 46 is energized the valve member 38 is moved to the left, Figure 3, to vent the compartment 66 of the motor to the atmosphere thereby energizing said motor to establish the transmission in its low gear setting; and when the solenoid 42 is energized the compartment 64 of the motor 10 is vented to the atmosphere thereby effecting an energization of said motor to establish the transmission in its high gear setting.

The electrical means for controlling the valve operating solenoids 42 and 46 constitutes the most important feature of my invention and includes a two-stage vehicle speed responsive governor operated switch 72, no claim to which is made, and a two-stage manifold vacuum operated brush type switch 74. As is disclosed in Figure 5 the governor operated switch 72 includes a switch 76 which is made when the vehicle exceeds a certain speed, say 10 M. P. H., and switch 78, which is made when the vehicle speed is dropped below 10 M. P. H. As is disclosed in this figure the switches 76 and 78 are operated by a flyball type of governor 79 preferably operative in accordance with the speed of the vehicle. The manifold vacuum operated switch 74, no claim to which is made, is disclosed in detail in Figure 1 and includes a vacuum motor 80 comprising a casing 82 and power element 84 the latter being connected to a switch operating rod 86 of insulating material. The latter member at its end is connected to a flange 88 of electrically conductive material which, together with fixed contacts 89 and 90, constitutes a switch for in part controlling the low gear controlling valve operating solenoid 46. The flange 88, when the motor 80 is vacuum energized a substantial amount, say by virtue of a degree of vacuum measured by six inches of mercury, will be moved upwardly to move into contact with fixed contacts 91 and 92; and this switch 88, 91, 92 provides one of the electrical controls for the high gear solenoid 42.

Figure 5:
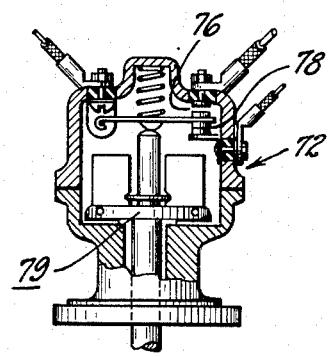
Figure 5 is a view disclosing the details of the governor operated switch of my invention.

As is disclosed in Figures 1 and 5 the manifold vacuum operated switch 88, 89, 90 is electrically connected in series with the grounded valve operating solenoid 46, the governor operated switch 78, a grounded battery 94, an accelerator operated breaker switch 96 which is broken when the accelerator is released just short of the throttle closed position and which is made in all other positions of the accelerator. The manifold vacuum operated switch 88, 91, 92 is electrically connected in series with the grounded battery 94, the accelerator operated switch 96, the governor operated switch 76 and the grounded valve operating solenoid 42. The low gear controlling governor operated switch 78 is also electrically connected in series with the grounded valve operating solenoid 46, the accelerator operated switch 96 and the grounded battery 94.

Electrical means may be provided to automatically effect a closing of the throttle 29 of the vehicle when the torque and speed responsive control means of my invention is operative to effect an operation of the shifter motor 10. Such a closure of the throttle prevents an undesired speeding up of the engine while the operation of the transmission is being carried out; furthermore the closure of the throttle automatically increases the degree of vacuum within the intake manifold of the engine thereby insuring a sufficiently energized motor to effect the operation of the transmission.

Figure 4:
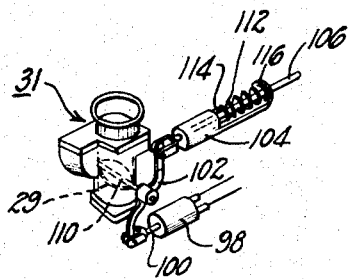
Figure 4 is a view disclosing the throttle closure mechanism of my invention.

The throttle closing electrical means includes a grounded solenoid 98, Figure 4, having its armature, not shown, connected by a rod 100 to the lower arm of a two-armed throttle operated lever 102. The upper arm of this lever is pivotally connected to the outer end of a rod 104 recessed to receive one end of a rod 106 which is connected to the accelerator 108 of the car. The lever 102 is drivably connected to a shaft 110 upon which is mounted the throttle valve 29 of the carburetor 31 of the engine. A coil spring 112, sleeved over the rod 106, is interposed between a stop member 114 pinned to the rod 106 and a flange 116 constituting the end portion of the rod 104.

A throttle opening movement of the rod 106 to the right, Figures 1 and 5, serves to place the spring 112 under compression as the lever 102 is being rotated to open the throttle; however, when the throttle closing solenoid 98 is energized the spring 112 is compressed as the lever 102 is being rotated counterclockwise to close the throttle. It is apparent therefore that the spring 112 and cooperating parts provide a yieldable connection between the accelerator and the throttle said connection making possible a closing of the throttle, to facilitate an operation of the transmission operating mechanism, despite a depression of the accelerator by the driver of the vehicle.

Describing now the electrical means for controlling the operation of the grounded throttle closing solenoid 98 the winding of said solenoid is electrically connected to the control switch 119 of a double wound relay 120, Figure 1, no claim to which is made; and each one of two fixed contacts 121 and 122 of said switch is in turn directly connected to the grounded battery 94 or other source of electrical power. A coil 124 of the relay is electrically connected to the electrical connection between the manifold vacuum operated switch 88, 89, 90 and the solenoid 46; and said coil is also electrically connected to a grounded transmission operated breaker switch 126 which is biased to its closed position, preferably by spring means 127, and is opened by said spring 12 when said transmission is established in its low gear setting. A second coil 128 of the relay is electrically connected to the electrical connection between the manifold vacuum operated switch 88, 91, 92 and the grounded valve operating solenoid 42; and said coil is also electrically connected to a grounded transmission operated breaker switch 130 which is normally closed by a spring 132 but which is opened by the spring when the transmission is established in its high gear setting.

Describing now the complete operation of the mechanism of my invention it will be assumed that the internal combustion engine 62 of the vehicle is idling, that the accelerator is released to completely close the throttle valve 29 and open the switch 96, and that the two-speed axle transmission mechanism 12 is established in its low gear setting. It will also be assumed that the change speed transmission 14 is established in a relatively low gear setting. The intake manifold 60 is at this time, by virtue of the pumping operation of the pistons of the engine and by virtue of the fact that the throttle valve is closed, partially evacuated thereby providing a source of vacuum for effecting an energization of the shifter motor 10.

To get the vehicle under way the driver will now depress the accelerator to speed up the engine and will, if the vehicle is equipped with a clutch mechanism between the transmission 14 and the engine, effect an engagement of said clutch. Then when the speed of the vehicle exceeds 10 M. P. H. the governor 79 will operate to close the switch 76 and when the manifold vacuum reaches the aforementioned critical factor of six inches of mercury the switch 88, 91, 92 will be closed thereby completing the electrical circuit, via the then closed accelerator operated switch 96, to effect an energization of the high gear solenoid 42; and this operation will serve to effect an operation of the motor 10 to establish the transmission in its high gear setting the throttle 29 being momentarily closed to facilitate this operation. The driver may, of course, either before or after this high gear operation of the transmission 12 is effected, operate the transmission 14 to establish the same in its desired, say its high gear, setting.

It will now be assumed that the vehicle is traveling along at a relatively high speed with the transmission 12 established in its high gear settings; and it will also be assumed that the vehicle reaches the base of a mountain. The engine will then probably slow down in speed thereby lowering the vacuum in the manifold 60; and this operation will, when said vacuum drops below a critical factor measured by say two inches of mercury, effect a closure of the switch 88, 89, 90 thereby effecting an operation of the motor 10 and throttle closing solenoid 98 to establish the transmission 12 in its low gear setting. This operation of the transmission will of course facilitate a climbing of the mountain. Then after the vehicle again reaches level ground the increase in speed of the engine, with a resulting increase in manifold vacuum, will again automatically effect a high gear setting of the transmission.

If the driver should, with the car traveling above 10 M. P. H., desire to pass a car on the road, he need but depress the accelerator to substantially open the throttle valve thereby lowering the intake manifold vacuum; and this operation results in an operation of the motor 10 to effect the low gear setting of the transmission 12. This operation of the transmission, often called a kickdown operation, will of course be of aid in passing the aforementioned car.

Describing another operation of the mechanism of my invention, when the vehicle is slowed down to 10 M. P. H. and assuming that the accelerator is at least depressed sufficiently to close the switch 96, then an electric circuit is closed to energize the solenoid 46 resulting in a low gear setting of the transmission 12; and this operation of the mechanism insures the desired low gear setting of the transmission when the vehicle is being brought to a stop. If it is desired to bring the vehicle to a stop with the transmission 12 established in its high gear setting the driver may accomplish this end by completely releasing the accelerator as the speed is decreased to and below the lowermost critical factor. Incidentally it is to be observed that the presence of the accelerator operated switch 96 in the mechanism prevents a shift into low gear as the vehicle is being decelerated to a stop with the accelerator released.

There is thus provided a simple and effective mechanism for operating the two-speed axle of an automotive vehicle said mechanism being both speed and torque responsive. When the vehicle is traveling above a certain critical speed, say 10 M. P. H., this two-speed axle transmission mechanism is automatically shuttled between its high and low gear settings depending upon the degree of vacuum in the intake manifold. With the vehicle traveling at a relatively high speed it is best that the two-speed axle be established in its high gear setting; and with the mechanism of applicant's invention this setting of the transmission is assured provided the throttle valve is not opened so widely as to kill the vacuum necessary to effect said operation. And with the mechanism of applicant's invention should the car be suddenly slowed down to a relatively low speed then the mechanism of the invention will be automatically operated to establish the transmission in its low gear setting. The throttle closing mechanism of the invention makes it unnecessary, by virtue of its control of the engine torque, for the driver to momentarily close the throttle valve to effect the shift of the transmission.

I claim:

1. In an automotive vehicle provided with a change speed transmission mechanism and an accelerator, power means for operating the transmission including a pressure differential operated motor, valve means, including a plurality of parts, for controlling the operation of the motor, and means for controlling the operation of the valve means including a switch mechanism comprising two switches one of which is electrically connected to one part of the valve mechanism and the other of which is connected to another part of the valve mechanism, another pressure differential operated motor for operating the two switches, a vehicle speed responsive governor, a switch operated by said governor and electrically connected to the aforementioned two switches, an accelerator operated switch electrically connected to the governor operated switch, and a source of electrical power electrically connected to the accelerator operated switch.

2. In an automotive vehicle provided with a change speed transmission and an accelerator, power means for operating the transmission including a double acting pressure differential operated motor, valve means, including two three-way valves, for controlling the operation of the motor, and means, including a solenoid for operating one three-way valve and another solenoid for operating the other three-way valve, for controlling the operation of the valve means, and further including a motor operated switch mechanism including two switches one of said switches being connected to one of the solenoids and the other of said switches being connected to the other of the two solenoids, a pressure differential operated motor for operating said switches, a vehicle speed responsive governor, a switch operated by said governor and electrically connected to the aforementioned two switches, an accelerator operated switch electrically connected to the governor operated switch, and a source of electrical power electrically connected to the accelerator operated switch.

3. In an automotive vehicle provided with a change speed transmission mechanism, an internal combustion engine comprising an intake manifold and an accelerator; power means for operating the transmission including a double acting pressure differential operated motor, fluid transmitting means interconnecting the motor and the manifold, valve means, including two three-way valves, for controlling the operation of the motor, and means for controlling the operation of the valve means including a solenoid for operating one three-way valve and another solenoid for operating the other three-way valve and further including a motor operated switch mechanism comprising two switches one of said switches being electrically connected to one of the solenoids and the other of said switches being electrically connected to the other of the solenoids, a pressure differential operated motor for operating said switches, fluid transmitting means interconnecting the latter motor and manifold, a vehicle speed responsive governor, a switch operated by said governor and electrically connected to the aforementioned two switches, an accelerator operated switch electrically connected to the governor operated switch, and a source of electrical power electrically connected to the accelerator operated switch.

4. In an automotive vehicle provided with a change speed transmission mechanism and an accelerator, power means for operating the transmission including a pressure differential operated motor, valve means for controlling the operation of the motor, and means for controlling the operation of the valve means including a plurality of solenoids and further including a switch mechanism comprising two switches each of which is electrically connected to one of the valve operating solenoids, another switch operating pressure differential operated motor for operating the two switches, a vehicle speed responsive governor, a switch operated by said governor and electrically connected to the aforementioned two switches, an accelerator operated switch electrically connected to the governor operated switch, a source of electrical power electrically connected to the accelerator operated switch, together with another switch operated by the governor, said switch being electrically connected to the accelerator operated switch, and to one of the valve operating solenoids.

5. In an automotive vehicle provided with a change speed transmission mechanism and an accelerator, power means for operating the transmission including a pressure differential operated motor, valve means for controlling the operation of the motor, and means for controlling the operation of the valve means including a switch mechanism comprising two switches, a pressure differential operated motor for operating said switches, a vehicle speed responsive governor, a switch operated by said governor and electrically connected to the aforementioned two switches, an accelerator operated switch electrically connected to the governor operated switch, a source of electrical power electrically connected to the accelerator operated switch, means, including a grounded solenoid, for operating the throttle to close the same when the first mentioned motor is operating to effect an operation of the transmission, and electrical means for controlling the operation of the solenoid including a switch which is normally closed but which is automatically opened just as the latter motor is about to complete its operation of establishing the transmission in gear.

6. In an automotive vehicle provided with a change speed transmission, power means for operating the transmission including a pressure differential operated motor connected to the transmission, valve means for controlling the operation of the motor, and means for controlling the operation of the valve means including, in series, a fluid pressure responsive switch mechanism comprising a plurality of switches, a vehicle speed responsive governor operated switch mechanism, and a source of electrical power, and further including another pressure differential operated motor said motor being connected to the fluid pressure responsive switch mechanism, said fluid pressure responsive switch mechanism providing a means, cooperating with the governor operated switch mechanism, for effecting a plurality of operations of the transmission operating motor when the vehicle is traveling at or above a certain speed; together with automatically operated power means for keeping the throttle closed as the latter motor is performing its operation upon the transmission.

7. In an automotive vehicle provided with a change speed transmission, power means for operating the transmission including a pressure differential operated motor operably connected to the transmission, valve means for controlling the operation of the motor, and means for controlling the operation of the valve means including a fluid pressure responsive switch mechanism consisting of a switch housing and switch mechanism within said housing consisting of two switches and a second pressure differential operated motor for operating said switches, a vehicle speed responsive governor operated switch mechanism and a source of elecrical power, the fluid pressure responsive switch mechanism providing a means, cooperating with the governor operated switch mechanism, for effecting a plurality of operations of the transmission operating motor when the vehicle is traveling at or above a certain speed.

8. In an automotive vehicle provided with a change speed transmission, power means for operating the transmission including a pressure differential operated motor operably connected with the transmission, valve means for controlling the operation of the motor, and means for controlling the operation of the valve means including a fluid pressure responsive switch mechanism consisting of a switch housing and switch mechanism within said housing consisting of two switches and a second pressure differential operated motor for operating said switches, a vehicle speed responsive governor operated switch mechanism and a source of electrical power, the fluid pressure responsive switch mechanism providing a means, cooperating with the governor operated switch mechanism, for effecting a plurality of operations of the transmission operating motor when the vehicle is traveling at or above a certain speed; together with another governor operated switch mechanism electrically connected in parallel with the aforementioned governor operated switch mechanism and operative to insure a certain operation of the transmission when the speed of the vehicle drops below a certain factor regardless of the operation of the fluid pressure responsive switch mechanism.

References Cited in the file of this patent
UNITED STATES PATENTS

| Number | Name | Date |
|---|---|---|
| 2,234,463 | Brewer | Mar. 11, 1941 |
| 2,252,009 | Kenny | Aug. 12, 1941 |
| 2,349,147 | Dunn | May 16, 1944 |
| 2,366,253 | Griswold | Jan. 2, 1945 |
| 2,366,254 | Paton | Jan. 2, 1945 |
| 2,380,491 | Ball | July 31, 1945 |
| 2,380,492 | Ball | July 31, 1945 |
| 2,407,289 | La Brie | Sept. 10, 1946 |
| 2,440,558 | Price | Apr. 27, 1948 |
| 2,444,953 | Polomski | July 13, 1948 |
| 2,514,002 | Long | July 4, 1950 |